(12) United States Patent
Hamada

(10) Patent No.: US 8,198,777 B2
(45) Date of Patent: Jun. 12, 2012

(54) AUTOMOTIVE ALTERNATOR WITH MAGNET HOLDER

(75) Inventor: Hiroshi Hamada, Anjo (JP)

(73) Assignee: Denso Corporation, Kariya (JP)

( * ) Notice: Subject to any disclaimer, the term of this patent is extended or adjusted under 35 U.S.C. 154(b) by 517 days.

(21) Appl. No.: 12/461,720

(22) Filed: Aug. 21, 2009

(65) Prior Publication Data

US 2010/0052456 A1 Mar. 4, 2010

(30) Foreign Application Priority Data

Aug. 29, 2008 (JP) ................................. 2008-220729

(51) Int. Cl.
*H02K 1/27* (2006.01)
*H02K 1/28* (2006.01)
*H02K 15/03* (2006.01)

(52) U.S. Cl. .................................. 310/156.72; 310/263

(58) Field of Classification Search ............. 310/156.66, 310/156.72, 263
See application file for complete search history.

(56) References Cited

U.S. PATENT DOCUMENTS

| | | | |
|---|---|---|---|
| 5,483,116 A | 1/1996 | Kusase et al. | |
| 5,793,144 A | 8/1998 | Kusase et al. | |
| 5,907,209 A | 5/1999 | Ishida | |
| 5,925,964 A | 7/1999 | Kusase et al. | |
| 6,013,968 A * | 1/2000 | Lechner et al. | 310/263 |
| 7,545,074 B2 * | 6/2009 | Maekawa et al. | 310/263 |
| 2002/0053855 A1 | 5/2002 | Tan et al. | |
| 2004/0032183 A1 | 2/2004 | Nakamura et al. | |
| 2007/0228866 A1 | 10/2007 | Nakamura | |
| 2007/0262672 A1 * | 11/2007 | Maekawa et al. | 310/263 |
| 2008/0048516 A1 | 2/2008 | Oowatari et al. | |
| 2009/0079294 A1 * | 3/2009 | Oowatari et al. | 310/263 |
| 2010/0052456 A1 * | 3/2010 | Hamada | 310/156.12 |

FOREIGN PATENT DOCUMENTS

| | | |
|---|---|---|
| JP | A-3-265450 | 11/1991 |
| JP | A-4-165950 | 6/1992 |
| JP | A-4-251553 | 9/1992 |
| JP | A-7-123664 | 5/1995 |
| JP | A-10-201150 | 7/1998 |
| JP | A-2003-52157 | 2/2003 |
| JP | A-2003-339141 | 11/2003 |
| JP | A-2006-109573 | 4/2006 |
| JP | A-2008-54392 | 3/2008 |

* cited by examiner

Primary Examiner — Quyen Leung
Assistant Examiner — David Scheuermann
(74) Attorney, Agent, or Firm — Oliff & Berridge, PLC

(57) ABSTRACT

An automotive alternator includes a magnet holder that is composed of first and second magnet holder pieces. Each of the first and second magnet holder pieces is made of a non-magnetic metal plate to have a one-piece structure. Each of the first and second magnet holder pieces includes a plurality of receiving portions, each of which receives a permanent magnet, and a plurality of connecting portions. All the receiving portions of the first magnet holder piece have the same orientation. Each of the connecting portions of the first magnet holder piece connects a circumferentially-adjacent pair of the receiving portions of the first magnet holder piece. All the receiving portions of the second magnet holder piece have the same orientation. Each of the connecting portions of the second magnet holder piece connects a circumferentially-adjacent pair of the receiving portions of the second magnet holder piece.

12 Claims, 10 Drawing Sheets

← FRONT    REAR →

← REAR    FRONT →

AUTOMOTIVE ALTERNATOR WITH MAGNET HOLDER

CROSS-REFERENCE TO RELATED APPLICATION

This application is based on and claims priority from Japanese Patent Application No. 2008-220729, filed on Aug. 29, 2008, the content of which is hereby incorporated by reference in its entirety into this application.

BACKGROUND OF THE INVENTION

1. Technical Field of the Invention

The present invention relates generally to automotive alternators for use in motor vehicles, such as passenger cars and trucks. More particularly, the invention relates to an automotive alternator which includes an improved magnet holder for holding a plurality of permanent magnets between interleaved claw poles of a pair of Lundell-type pole cores.

2. Description of the Related Art

There is known a method of improving the efficiency of an automotive alternator, which includes a rotor having a pair of Lundell-type pole cores, by disposing a plurality of permanent magnets between the pole cores.

More specifically, each of the pole cores is secured on a rotating shaft of the rotor and includes a plurality of claw poles extending in the axial direction of the rotating shaft. The claw poles of one of the pole cores are alternately arranged with those of the other pole core in the circumferential direction of the rotating shaft. Moreover, each circumferentially-adjacent pair of the claw poles of the pole cores are so magnetized as to have opposite polarities. As a result, leakage of magnetic flux may occur between each circumferentially-adjacent pair of the claw poles. In view of the above, according to the method, each of the permanent magnets is interposed between a circumferentially-adjacent pair of the claw poles of the pole cores, so as to reduce the leakage of magnetic flux between the pair of the claw poles and to direct the magnetic flux developed by the permanent magnet toward a field coil of the alternator, thereby improving the efficiency of the alternator.

Furthermore, for each of the permanent magnets, the centrifugal force acting on the permanent magnet is generally sustained by ledge portions formed in the claw poles adjacent to the permanent magnet. However, in addition to the centrifugal force, the permanent magnet also receives an urging force, which urges the permanent magnet in the circumferential direction during acceleration of the alternator, and an exciting force caused by a harmonic magnetic field or external vibration. Therefore, it is necessary to fix the permanent magnet between the adjacent claw poles, thereby restricting movement of the permanent magnet in both the radial and circumferential directions of the rotating shaft. In addition, the permanent magnet is generally brittle, and it is thus preferable to use a magnet holder made of a non-magnetic material to enclose the permanent magnet, thereby protecting the permanent magnet; it is further preferable to bond the permanent magnet to the inner surface of the magnet holder.

Japanese Patent First Publication No. 2008-54392, an English Equivalent of which is US Patent Application Publication NO. 2008/0048516 A1, discloses a permanent magnet protection mechanism which includes a plurality of magnet holders and a plurality of connecting members. Each of the magnet holders holds one of a plurality of permanent magnets. Each of the connecting members connects an adjacent pair of the magnet holders. All of the magnet holders and connecting members are integrally formed by punching and bending a band plate of nonmagnetic stainless steel. With the integral formation, it is possible to eliminate the step of connecting or bonding the connecting members to the magnet holders, and to achieve a reliable connection between the connecting members and the magnet holders.

However, in the above permanent magnet protection mechanism, the magnet holders are shaped to fit to the side faces of claw poles of a pair of Lundell-type pole cores. Consequently, the circumferential interval between each adjacent pair of the magnet holders becomes very small at the tip of the claw pole interposed therebetween. Accordingly, in the band plate, the longitudinal interval between each adjacent pair of those portions which subsequently make up the magnet holders is very small at one of the lateral ends of the band plate. Consequently, with the small longitudinal interval, it is difficult to form, in the subsequent punching and bending steps, sufficiently large side faces of the magnet holders. As a result, without sufficiently large side faces, it is difficult for the magnet holders to completely cover the side faces of the permanent magnets; thus, it is difficult for the magnet holders to securely hold and protect the permanent magnets.

Moreover, to completely cover all of the radial end faces and axial end faces of the permanent magnets, it is necessary for the band plate to have a width which is greater than twice the sum of the length and height of the permanent magnets. However, with such a large width of the band plate, the yield rate at the lateral ends of the band plate becomes very low.

Furthermore, in the above permanent magnet protection mechanism, each of the connecting members connects an adjacent pair of the magnet holders at the base of the claw pole interposed between the pair of the magnet holders. Consequently, the connecting members are alternately arranged at the lateral ends of the permanent magnet protection mechanism in the longitudinal direction of the permanent magnet protection mechanism (i.e., the circumferential direction of the rotating shat).

In mass production, the permanent magnet protection mechanism is generally not immediately mounted to the pole cores, but temporality stored in a storage box along with other permanent magnet protection mechanisms. However, with the arrangement of the connecting members as described above, the permanent magnet protection mechanism may be easily entwined with the other permanent magnet protection mechanisms in the storage box. Consequently, it may be difficult to take out, without deformation, the permanent magnet protection mechanism from the storage box.

SUMMARY OF THE INVENTION

According to the present invention, there is provided an automotive alternator which includes a rotor and a stator. The rotor creates a rotating magnetic field. The rotor includes a rotating shaft, a pair of first and second pole cores, a plurality of permanent magnets, and a magnet holder. Each of the first and second pole cores is fixed on the rotating shaft and includes a plurality of claw poles extending in the axial direction of the rotating shaft. The claw poles of the first pole core are alternately arranged with the claw poles of the second pole core in the circumferential direction of the rotating shaft. Each of the permanent magnets is interposed between a circumferentially-adjacent pair of the claw poles of the first and second pole cores to reduce leakage of magnetic flux therebetween. The magnet holder holds all the permanent magnets. The stator generates AC power in the rotating magnetic field created by the rotor.

Further, in the automotive alternator, the magnet holder is composed of first and second magnet holder pieces. Each of the first and second magnet holder pieces is made of a nonmagnetic metal plate to have a one-piece structure. Each of the first and second magnet holder pieces includes a plurality of receiving portions and a plurality of connecting portions. All the receiving portions of the first magnet holder piece have the same orientation and each receive therein a corresponding one of the permanent magnets. Each of the connecting portions of the first magnet holder piece extends in the circumferential direction of the rotating shaft to connect a circumferentially-adjacent pair of the receiving portions of the first magnet holder piece. All the receiving portions of the second magnet holder piece have the same orientation and each receive therein a corresponding one of the permanent magnets. Each of the connecting portions of the second magnet holder piece extends in the circumferential direction of the rotating shaft to connect a circumferentially-adjacent pair of the receiving portions of the second magnet holder piece.

With the same orientation of the receiving portions of the first magnet holder piece, in forming the first magnet holder piece by, for example, punching and bending the nonmagnetic metal plate, it is possible to arrange the receiving portions at sufficiently large intervals in the longitudinal direction of the metal plate on both the lateral ends of the metal plate. Consequently, it is possible to form sufficiently large faces of each of the receiving portions. As a result, with the sufficiently large faces, it is possible for each of the receiving potions to completely cover the corresponding permanent magnet received therein, thereby securely holding and protecting the corresponding permanent magnet.

Similarly, with the same orientation of the receiving portions of the second magnet holder piece, in forming the second magnet holder piece by, for example, punching and bending the nonmagnetic metal plate, it is possible to arrange the receiving portions at sufficiently large intervals in the longitudinal direction of the metal plate on both the lateral ends of the metal plate. Consequently, it is possible to form sufficiently large faces of each of the receiving portions. As a result, with the sufficiently large faces, it is possible for each of the receiving potions to completely cover the corresponding permanent magnet received therein, thereby securely holding and protecting the corresponding permanent magnet.

According to further implementations of the present invention, the connecting portions of the first magnet holder piece are formed to be aligned with each other in the circumferential direction of the rotating shaft, and away from ends of the receiving portions of the first magnet holder piece in the axial direction of the rotating shaft. The connecting portions of the second magnet holder piece are formed to be aligned with each other in the circumferential direction of the rotating shaft, and away from ends of the receiving portions of the second magnet holder piece in the axial direction of the rotating shaft. Further, the connecting portions of the first magnet holder piece are arranged to abut the connecting portions of the second magnet holder piece in the axial direction of the rotating shaft. Furthermore, each of the connecting portions of the first and second magnet holder pieces has a side face that is made uneven to include at least one protrusion. At boundaries between the connecting portions of the first magnet holder piece and the connecting portions of the second magnet holder piece, only the protrusions of the connecting portions of the first magnet holder piece abut the protrusions of the connecting portions of the second magnet holder piece.

The shape of the first magnet holder piece is in inverse relation to the shape of the second magnet holder piece in the radial direction of the rotating shaft. Further, in each of the first and second magnet holder pieces, each of the connecting portions extends from a side face of a corresponding one of the receiving portions with a radial side thereof centered on the side face, and has a recess formed away from the corresponding receiving portion by a predetermined distance. Each of the receiving portions of the first magnet holder piece is fitted in the recess formed in a corresponding one of the connecting portions of the second magnet holder piece, and each of the receiving portions of the second magnet holder piece is fitted in the recess formed in a corresponding one of the connecting portions of the first magnet holder piece.

In each of the receiving portions of the first magnet holder piece, there is formed a recess through which a corresponding one of the connecting portions of the second magnet holder piece passes. Each of the receiving portions of the first magnet holder piece completely encloses, together with the corresponding connecting portion of the second magnet holder piece, the permanent magnet received therein. Similarly, in each of the receiving portions of the second magnet holder piece, there is formed a recess through which a corresponding one of the connecting portions of the first magnet holder piece passes. Each of the receiving portions of the second magnet holder piece completely encloses, together with the corresponding connecting portion of the first magnet holder piece, the permanent magnet received therein.

Each of the receiving portions of the first and second magnet holder pieces has formed, in each of its circumferential side walls, two slits respectively on opposite sides of a root part of the connecting portion extending from the circumferential side wall.

Each of the first and second magnet holder pieces has an opposite pair of ends that are apart from each other in the circumferential direction of the rotating shaft with a gap formed therebetween. The opposite pair of ends are both arranged to abut a radially inner surface of one of the claw poles of the first and second pole cores. Further, the gap is preferably positioned, in the circumferential direction of the rotating shaft, at the center of the one of the claw poles.

The orientation of the receiving portions of the first magnet holder piece is different from the orientation of the receiving portions of the second magnet holder piece. The receiving portions of the first magnet holder piece are alternately arranged with the receiving portions of the second magnet holder piece in the circumferential direction of the rotating shaft.

The claw poles of the first pole core are connected to the claw poles of the second pole core through an annular connecting member that is disposed radially inward of the connecting portions of the first and second magnet holder pieces. The annular connecting member is welded to all of the claw poles of the first and second pole cores. The connecting portions of each of the first and second magnet holder pieces are welded to the claw poles of one of the first and second pole cores.

BRIEF DESCRIPTION OF THE DRAWINGS

The present invention will be understood more fully from the detailed description given hereinafter and from the accompanying drawings of preferred embodiments of the invention, which, however, should not be taken to limit the invention to the specific embodiments but are for the purpose of explanation and understanding only.

In the accompanying drawings.

DESCRIPTION OF PREFERRED EMBODIMENTS

Figure 1:
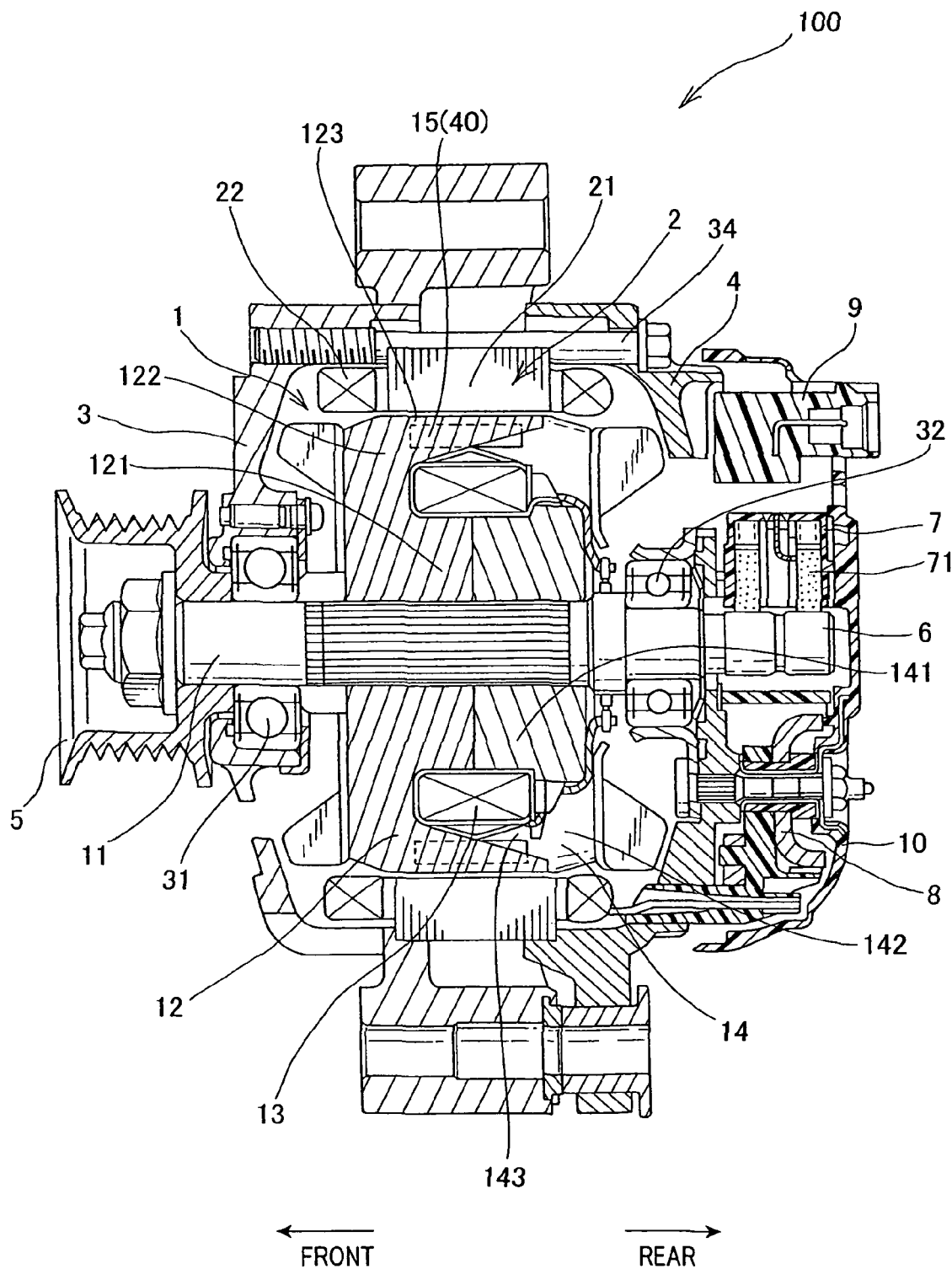
FIG. 1 is a schematic cross-sectional view of a brushed automotive alternator according to the first embodiment of the invention.

Preferred embodiments of the present invention will be described hereinafter with reference to FIGS. 1-18.

It should be noted that, for the sake of clarity and understanding, identical components having identical functions in different embodiments of the invention have been marked, where possible, with the same reference numerals in each of the figures.

First Embodiment

FIG. 1 shows the overall configuration of a brushed automotive alternator 100 according to the first embodiment of the invention. The alternator 100 is designed to be used in a motor vehicle, such as a passenger car or a truck.

As shown in FIG. 1, the alternator 100 includes a rotor 1, a stator 2, a front housing 3, a rear housing 4, a pulley 5, a pair of slip rings 6, a brush assembly 7, a rectifier 8, a voltage regulator 9, and a rear cover 10.

The stator 2 is disposed to surround the rotor 1. The stator 2 includes a stator core 21 and a three-phase stator winding 22 wound around the stator core 21.

The front and rear housings 3 and 4 together support and accommodate therein both the rotor 1 and the stator 2. The front and rear housings 3 and 4 are fixed to each other by means of a plurality of bolts 34. Moreover, the front and rear housings 3 and 4 rotatably support a rotating shaft 11 of the rotor 1 respectively via bearings 31 and 32.

The pulley 5 is mounted on a front end portion of the rotating shaft 11 of the rotor 1, so that torque generated by an internal combustion engine of the vehicle can be transmitted to the rotor 1 via the pulley 5, thereby driving the rotor 1.

The slip rings 6 are both provided on a rear end portion of the rotating shaft 11 of the rotor 1, and respectively connected to opposite ends of a field winding 13 of the rotor 1.

The brush assembly 7 is provided to supply field current to the field winding 13 during rotation of the rotor 1. The brush assembly 7 includes a pair of brushes 71 that are respectively spring-loaded on the slip rings 6 to establish sliding contacts with them during rotation of the rotor 1.

The rectifier 8 is configured to full-wave rectify three-phase AC power output from the three-phase stator winding 22 of the stator 2 into DC power. In addition, part of the DC power is used as the field current to energize the field winding 13 of the rotor 1.

The voltage regulator 9 is configured to regulate the output voltage of the alternator 100 by controlling the field current supplied to the field winding 13.

The rear cover 10 covers, from the rear side of the alternator 100, all of the brush assembly 7, the rectifier 8, and the voltage regulator 9, thereby protecting them from foreign matter.

The rotor 1 includes, in addition to the rotating shaft 11 and the field winding 13, a pair of Lundell-type pole cores 12 and 14, a plurality of permanent magnets 15, and a magnet holder 40.

Both the pole cores 12 and 14 are fixed on the rotating shaft 11, with the pole core 12 located on the front side of the pole core 14.

The pole core 12 includes a cylindrical boss portion 121, a disc portion 122, and a plurality of claw poles 123. The boss portion 121 is serration-fitted on the rotating shaft 11. The disc portion 122 extends radially outward from a front part of the boss portion 121. Each of the claw poles 123 extends axially backward from a radially outer part of the disc portion 122.

Similarly, the pole core 14 includes a cylindrical boss portion 141, a disc portion 142, and a plurality of claw poles 143. The boss portion 141 is serration-fitted on the rotating shaft 11. The disc portion 142 extends radially outward from a rear part of the boss portion 141. Each of the claw poles 143 extends axially forward from a radially outer part of the disc portion 142.

The pole cores 12 and 14 are so arranged that a rear end face of the boss portion 121 of the pole core 12 abuts a front end face of the boss portion 141 of the pole core 14. The field winding 13 is wound around both the boss portions 121 and 141, so as to be surrounded by the pole cores 12 and 14. Moreover, the claw poles 123 of the pole core 12 are interleaved with the claw poles 143 of the pole core 14. Consequently, the claw poles 123 are alternately arranged with the claw portions 143 in the circumferential direction of the rotating shaft 11. In addition, both the pole cores 12 and 14 are made of a soft magnetic material.

Each of the permanent magnets 15 is interposed between an adjacent pair of one of the claw poles 123 of the pole core 12 and one of the claw poles 143 of the pole core 14 in the circumferential direction of the rotating shaft 11. Moreover, each of the permanent magnets 15 is so magnetized as to reduce leakage of magnetic flux between the adjacent pair of claw poles 123 and 143. More specifically, each of the permanent magnets 15 is so polarized as to have, on each circumferential side face thereof, the same polarity as the claw pole 123 or 143 which faces the each circumferential side face.

Figure 2:
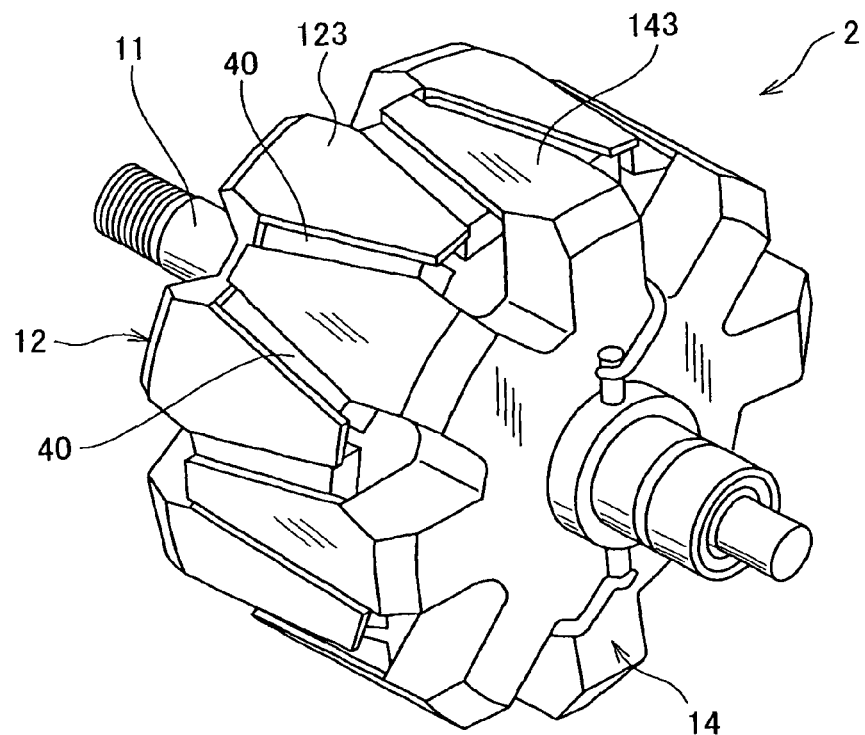
FIG. 2 is a schematic perspective view of a rotor of the alternator.
Figure 3:
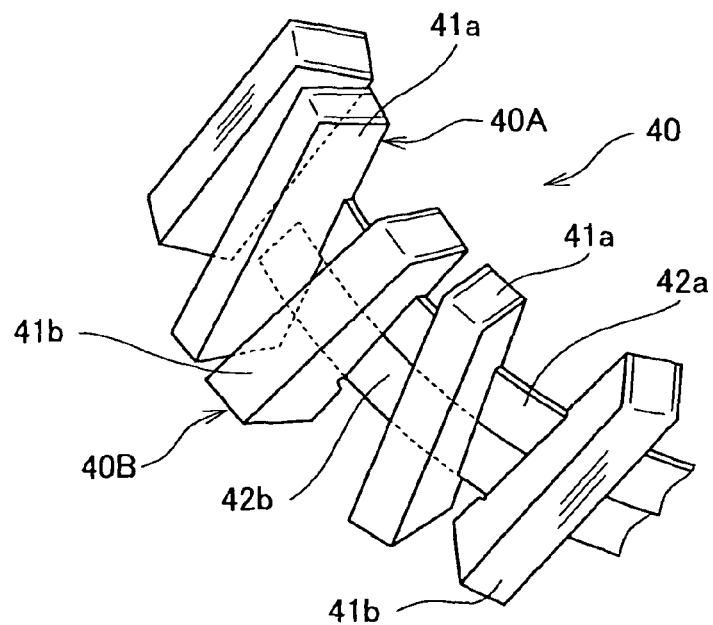
FIG. 3 is a schematic perspective view showing part of a magnet holder of the rotor.

Referring now to FIGS. 2 and 3, the magnet holder 40 is composed of a pair of magnet holder pieces 40A and 40B.

The magnet holder piece 40A includes a plurality of receiving portions 41a and a plurality of connecting portions 42a. Each of the receiving portions 41a is substantially box-shaped to receive therein a corresponding one of the permanent magnets 15. All the receiving portions 41a are identically oriented, so that they are parallel to each other. Moreover, the receiving portions 41a are equally spaced in the longitudinal direction of the magnet holder piece 40A (i.e., in the circumferential direction of the rotating shaft 11) at predetermine intervals. Each of the connecting portions 42a extends in the longitudinal direction of the magnet holder piece 40A to connect an adjacent pair of the receiving portions 41a. All the connecting portions 42a are aligned with each in the longitudinal direction of the magnet holder piece 40A. Furthermore, the magnet holder piece 40A is made by press forming a nonmagnetic metal plate (e.g., a nonmagnetic stainless steel plate) to have a one-piece structure. In other words, all of the receiving portions 41a and connecting portions 42a are formed in one piece.

Similarly, the magnet holder piece 40B includes a plurality of receiving portions 41b and a plurality of connecting portions 42b. Each of the receiving portions 41b is substantially box-shaped to receive therein a corresponding one of the permanent magnets 15. All the receiving portions 41b are identically oriented, so that they are parallel to each other. Moreover, the receiving portions 41b are equally spaced in the longitudinal direction of the magnet holder piece 40B (i.e., in the circumferential direction of the rotating shaft 11) at predetermine intervals. Each of the connecting portions 42b extends in the longitudinal direction of the magnet holder piece 40B to connect an adjacent pair of the receiving portions 41b. All the connecting portions 42b are aligned with each in the longitudinal direction of the magnet holder piece 40B. Furthermore, the magnet holder piece 40B is made by press forming a nonmagnetic metal plate (e.g., a nonmagnetic stainless steel plate) to have a one-piece structure. In other words, all of the receiving portions 41b and connecting portions 42b are formed in one piece.

The receiving portions 41a of the magnet holder piece 40A have a different orientation from the receiving portions 41b of the magnet holder piece 40B. More specifically, in FIG. 3, the receiving portions 41a are slanted to the left, whereas the receiving portions 41b are slanted to the right. Moreover, the receiving portions 41a of the magnet holder piece 40A are alternately arranged with the receiving portions 41b of the magnet holder piece 40B in the circumferential direction of the rotating shaft 11. Consequently, for each of the claw poles 123 and 143 of the pole cores 12 and 14, a pair of one of the receiving portions 41a and one of the receiving portions 41b are respectively located on opposite sides of the claw pole in the circumferential direction of the rotating shaft 11. Furthermore, the slanting angles of the receiving portions 41a and 41b are set respectively equal to those of the circumferential side faces of the claw poles 123 and 143 of the pole cores 12 and 14. In other words, the receiving portions 41a and 41b are shaped to fit to the circumferential side faces of the claw poles 123 and 143.

Figure 4:
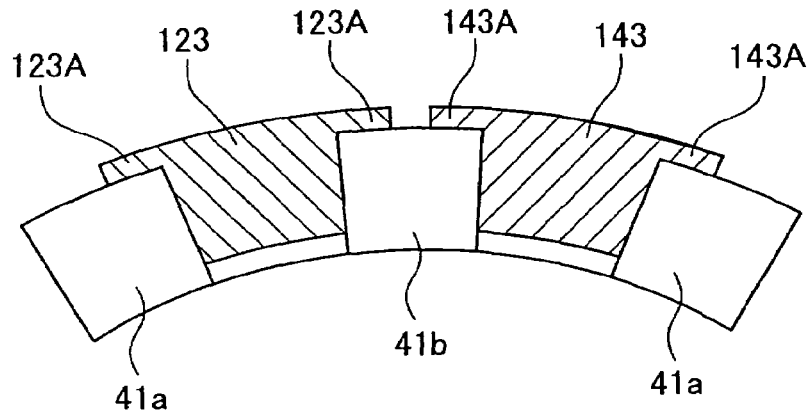
FIG. 4 is a schematic cross-sectional view showing ledge portions formed in claw poles of pole cores of the rotor.

Referring to FIG. 4, each of the claw poles 123 of the pole core 12 has a pair of ledge portions 123A that protrude from a radially outer part of the claw pole 123 respectively toward opposite sides in the circumferential direction of the rotating shaft 11. Similarly, each of the claw poles 143 of the pole core 14 has a pair of ledge portions 143A that protrude from a radially outer part of the claw pole 143 respectively toward opposite sides in the circumferential direction of the rotating shaft 11. Moreover, each of the receiving portions 41a and 41b of the magnet holder pieces 40A and 40B is interposed between an adjacent pair of the claw poles 123 and 143 of the pole cores 12 and 14 to abut, from the radially inner side, one of the ledge portions 123A of the claw pole 12 and one of the ledge portions 143A of the claw pole 14.

Figure 5:
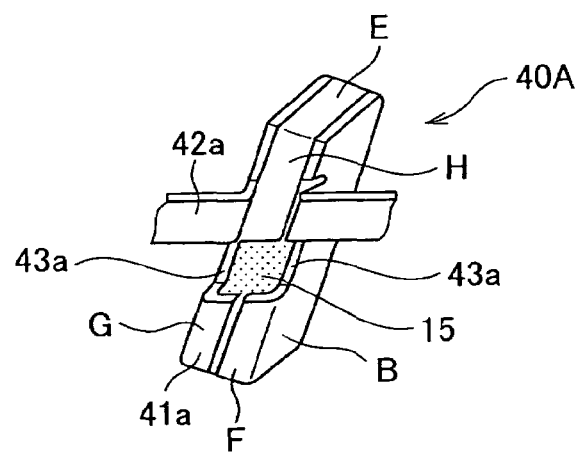
FIG. 5 is a schematic perspective view showing a receiving portion of the magnet holder with a permanent magnet received therein.
Figure 6:
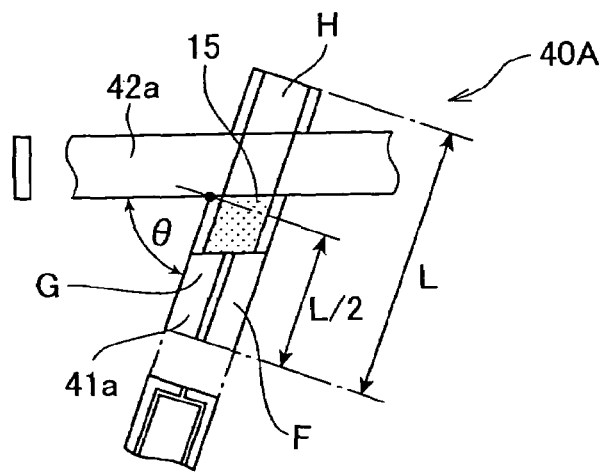
FIG. 6 is a plan view of the receiving portion with the permanent magnet received therein.
Figure 7:
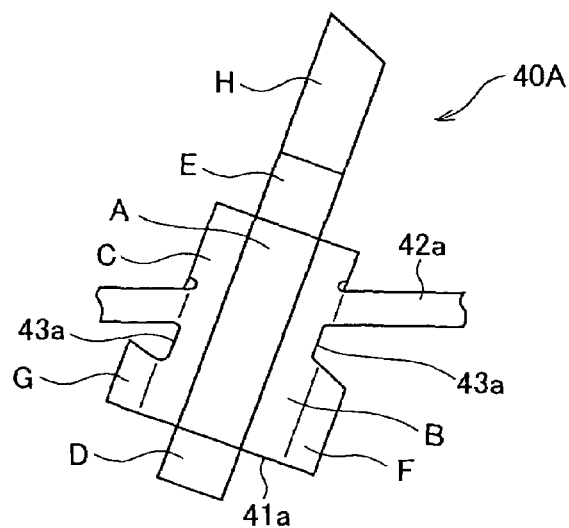
FIG. 7 is a development elevation of the receiving portion.

FIG. 5 shows, from the radially inner side, one of the receiving portions 41a of the magnet holder piece 40A with the corresponding permanent magnet 15 received therein. FIG. 6 is a plan view of the receiving portion 41a with the corresponding permanent magnet 15 received therein. FIG. 7 is a development elevation of the receiving portion 41a. In addition, all of the receiving portions 41a of the magnet holder piece 40A and the receiving portions 41b of the magnet holder piece 40B are identical in structure; therefore, only the structure of one of the receiving portions 41a will be described in detail below.

In manufacturing the magnet holder piece 40A, the nonmagnetic metal plate is first punched to obtain an intermediate product. In the intermediate product, as shown in FIG. 7, there are formed eight portions A, B, C, D, E, F, G, and H which are on the same plane. Then, each of the portions B, C, D, and E is bent perpendicular to the portion A, thereby forming an open box. Further, the corresponding permanent magnet 15 is placed in the open box. Thereafter, the portions F, G, and H are bent respectively perpendicular to the portions B, C, and E, thereby closing the open box with the corresponding permanent magnet 15 received therein. As a result, the receiving portion 41a is formed which has eight faces A, B, C, D, E, F, G, and H as shown in FIGS. 5 and 6.

Moreover, in each of the receiving portions 41a of the magnet holder piece 40A, there is formed a recess 43a, through which a corresponding one of the connecting portions 42b of the magnet holder piece 40B is to pass in assembling the magnet holder pieces 40A and 40B. Further, after assembling the magnet holder pieces 40A and 40B together, the recess 43a is filled with the corresponding connecting portion 42b, thereby making the radially inner surface of the receiving portion 41a flat and completely enclosing the permanent magnet 15 received in the receiving portion 41a. In addition, the corresponding connecting portion 42b abuts both the connecting portions 42a extending from the receiving portion 41a, as shown in FIG. 3.

Similarly, in each of the receiving portions 41b of the magnet holder piece 40B, there is formed a recess 43b (not shown), through which a corresponding one of the connecting portions 42a of the magnet holder piece 40A is to pass in assembling the magnet holder pieces 40A and 40B. Further, after assembling the magnet holder pieces 40A and 40B together, the recess 43b is filled with the corresponding connecting portion 42a, thereby making the radially inner surface of the receiving portion 41b flat and completely enclosing the permanent magnet 15 received in the receiving portion 41b. In addition, the corresponding connecting portion 42a abuts both the connecting portions 42b extending from the receiving portion 41b.

Furthermore, in the present embodiment, the magnet holder pieces 40A and 40B are first assembled together with the connecting portions 42a and 42b extending straight. Then, the assembly of the magnet holder pieces 40A and 40B is further bent into a ring shape, thereby forming the magnet holder 40.

Figure 8:
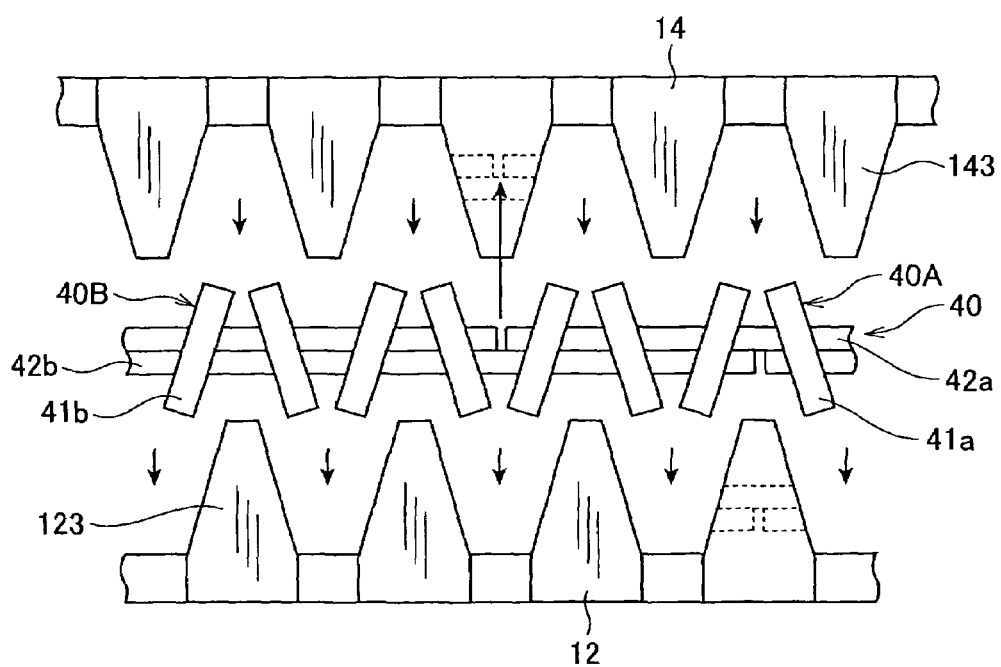
FIG. 8 is a development elevation illustrating a process of assembling the magnet holder to the pole cores.

FIG. 8 illustrates a process of assembling the magnet holder 40 to the pole cores 12 and 14 according to the present embodiment.

As shown in FIG. 8, the magnet holder 40, which has the permanent magnets 15 held therein, is first fitted to the pole core 12 along with the field winding 13 (not shown in FIG. 8). Then, the pole core 14 is further fitted to both the pole core 12 and the magnet holder 40. Consequently, as can be seen from FIG. 2, each of the receiving portions 41a and 41b of the magnet holder 40 is sandwiched between an adjacent pair of one of the claw poles 123 of the pole core 12 and one of the claw poles 143 of the pole core 14. Moreover, the connecting portions 42a and 42b of the magnet holder 40 extend in the circumferential direction of the rotating shaft 11 on the radially inner side of the claw poles 123 and 143 of the pole cores 12 and 14.

Furthermore, in the present embodiment, as shown in FIG. 8, the circumferential ends of the magnet holder piece 40A are made apart from each other with a gap formed therebetween; the gap is positioned at the midpoint between the pair of the receiving portions 41a and 41b adjacent to the gap. Consequently, the gap between the circumferential ends of the magnet holder piece 40A is positioned at the circumferential center of one of the claw poles 123 and 143 (depicted as one claw pole 143 in FIG. 8).

Similarly, the circumferential ends of the magnet holder piece 40B are made apart from each other with a gap formed therebetween; the gap is positioned on the midpoint between the pair of the receiving portions 41a and 41b adjacent to the gap. Consequently, the gap between the circumferential ends of the magnet holder piece 40B is positioned at the circumferential center of one of the claw poles 123 and 143 (depicted as one claw pole 123 in FIG. 8). In addition, the gap between the circumferential ends of the magnet holder piece 40B is located away from the gap between the circumferential ends of the magnet holder piece 40A in the circumferential direction of the rotating shaft 11.

Figure 9:
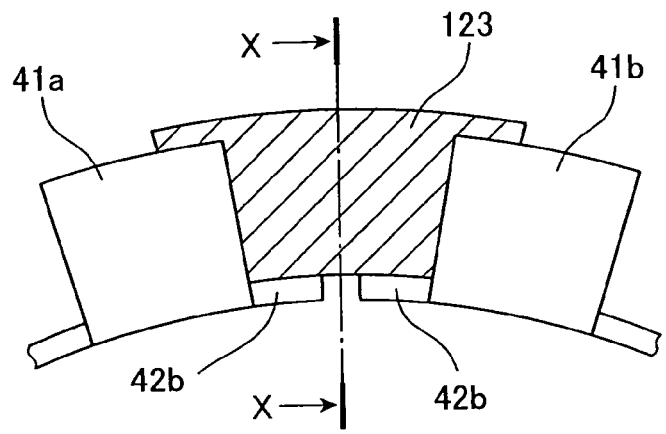
FIG. 9 is a schematic cross-sectional view showing the arrangement of circumferential ends of a magnet holder piece of the magnet holder.
Figure 10:
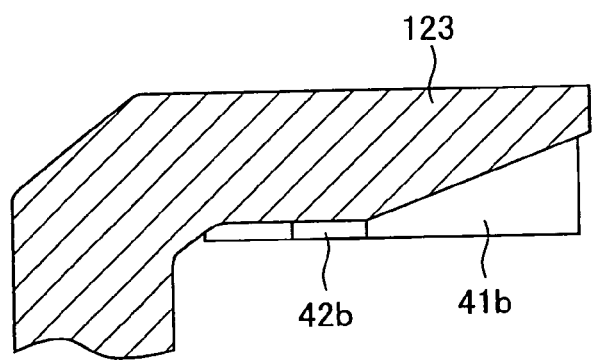
FIG. 10 is a cross-sectional view taken along the line X-X in FIG. 9.

With the above configuration, referring to FIGS. 9 and 10, both the circumferential ends of each of the magnet holder pieces 40A and 40B can reliably abut the radially inner surface of the one of the claw poles 123 and 143. Consequently, without fixing them by, for example, welding, both the circumferential ends of each of the magnet holder pieces 40A and 40B can be reliably prevented from being displaced radially outward due to centrifugal forces acting thereon.

Figure 11:
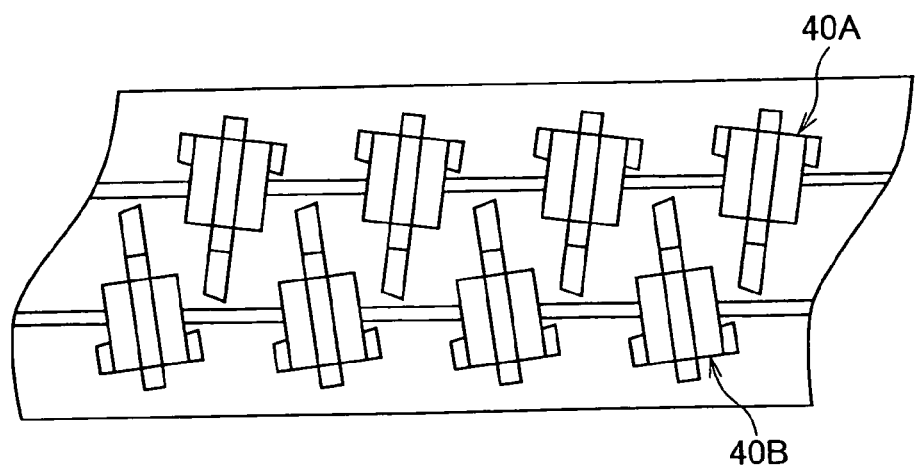
FIG. 11 is a schematic view illustrating an example of punching out two different magnet holder pieces of the magnet holder from a single nonmagnetic metal plate.

FIG. 11 illustrates an example of punching out both the magnet holder pieces 40A and 40B from a single nonmagnetic metal plate.

The receiving portions 41a of the magnet holder piece 40A have a developed shape as shown in FIG. 7. The receiving portions 41b of the magnet holder piece 40B have the same developed shape as, but a different orientation (or a different slanting direction) from the receiving portions 41 of the magnet holder piece 40B. Therefore, as shown in FIG. 11, it is possible to arrange the receiving portions 41a of the magnet holder piece 40A to interleave with the receiving portions 41b of the magnet holder piece 40B in the longitudinal direction of the nonmagnetic metal plate. As a result, the yield rate of the magnet holder pieces 40A and 40B can be improved.

In general, each of the claw poles 123 and 143 of the pole cores 12 and 14 has a symmetrical shape with respect to its axis; the axis is parallel to the rotating shaft 11. Accordingly, the permanent magnets 15, each of which is interposed between an adjacent pair of the claw poles 123 and 143, can be classified into two groups having different orientations.

In view of the above, in the present embodiment, the magnet holder 40 for holding the permanent magnets 15 is composed of the pair of magnet holder pieces 40A and 40B. The magnet holder piece 40A includes the receiving portions 41a all of which have the same orientation. Therefore, the receiving portions 41a can respectively receive the permanent magnets 15 of one of the two groups. Moreover, the magnet holder piece 40B includes the receiving portions 41b all of which have the same orientation. Therefore, the receiving portions 41b can respectively receive the permanent magnets 15 of the other group.

With the same orientation of the receiving portions 41a, in forming the magnet holder piece 40A by punching and bending a nonmagnetic metal plate, it is possible to arrange the receiving portions 41a at sufficiently large intervals in the longitudinal direction of the metal plate on both the lateral ends of the metal plate. Consequently, it is possible to form sufficiently large faces A-H of each of the receiving portions 41a. As a result, with the sufficiently large faces A-H, it is possible for each of the receiving potions 41a to completely enclose the corresponding permanent magnet 15 received therein, thereby securely holding and protecting the corresponding permanent magnet 15.

Similarly, with the same orientation of the receiving portions 41b, in forming the magnet holder piece 40B by punching and bending a nonmagnetic metal plate, it is possible to arrange the receiving portions 41b at sufficiently large intervals in the longitudinal direction of the metal plate on both the lateral ends of the metal plate. Consequently, it is possible to form sufficiently large faces A-H of each of the receiving portions 41b. As a result, with the sufficiently large faces A-H, it is possible for each of the receiving potions 41b to completely enclose the corresponding permanent magnet 15 received therein, thereby securely holding and protecting the corresponding permanent magnet 15.

Moreover, in the present embodiment, the connecting portions 42a of the magnet holder piece 40A are aligned with each other in the longitudinal direction of the magnet holder piece 40A (i.e., in the circumferential direction of the rotating shaft 11). Further, the connecting portions 42a connect parts of the receiving portions 41a away from ends of the receiving portions 41a in the lateral direction of the magnet holder piece 40A. In other words, the connecting portions 42a are away from the ends of the receiving portions 41a in the axial direction of the rotating shaft 11. Similarly, the connecting portions 42b of the magnet holder piece 40B are aligned with each other in the longitudinal direction of the magnet holder piece 40B (i.e., in the circumferential direction of the rotating shaft 11). Further, the connecting portions 42b connect parts of the receiving portions 41b away from ends of the receiving portions 41b in the lateral direction of the magnet holder piece 40B. In other words, the connecting portions 42b are away from the ends of the receiving portions 41b in the axial direction of the rotating shaft 11.

With the above configuration, when the magnet holder pieces 40A and 40B are temporarily stored in a storage box along with other magnet holder pieces, it is possible to easily take out the magnet holder pieces 40A and 40B from the storage box without causing them to be entwined with the other magnet holder pieces. Therefore, the above configuration of the magnet holder pieces 40A and 40B is particularly suitable for mass production.

Furthermore, in the present embodiment, the connecting portions 42a of the magnet holder piece 40A are arranged to abut the connecting portions 42b of the magnet holder piece 40B in the lateral direction of the magnet holder 40 (i.e., the axial direction of the rotating shaft 11).

With the above arrangement, in assembling the magnet holder pieces 40A and 40B to the pole cores 12 and 14, the receiving portions 41a and 41b of the magnet holder pieces 40A and 40B can be easily positioned between the claw poles 123 and 143 of the pole cores 12 and 14.

[Modification 1]

In the previous embodiment, as shown in FIG. 8, the connecting portions 41a of the magnet holder piece 40A and the connecting portions 41b of the magnet holder piece 40B each have a pair of flat side faces that are parallel to each other. Moreover, at the boundary between the magnet holder pieces 40A and 40B, the side faces of the connecting portions 41a completely abut the side faces of the connecting portions 41b.

Figure 12:
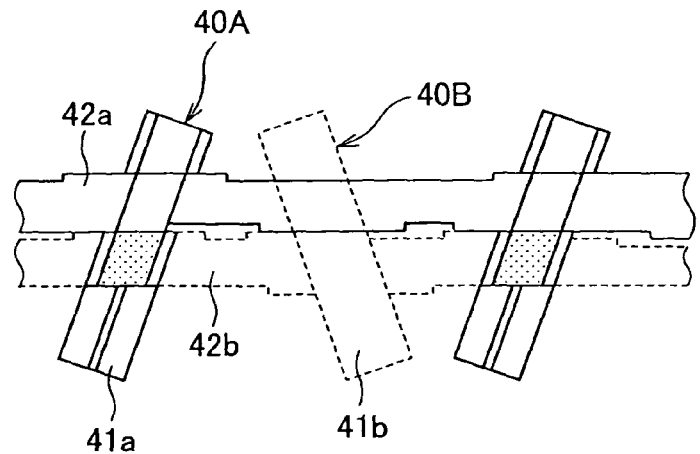
FIG. 12 is a schematic view illustrating a modification of the magnet holder pieces.

FIG. 12 shows the first modification of the magnet holder pieces 40A and 40B, where the magnet holder pieces 40A and 40B are viewed from the radially inner side (i.e., the side of the rotating shaft 11).

As shown in FIG. 12, in this modification, each of the side faces of the connecting portions 41a and 41b of the magnet holder piece 40A and 40B is made uneven to include at least one protrusion. Consequently, at the boundary between the magnet holder pieces 40A and 40B, only the protrusions of the connecting portions 41a abut the protrusions of the connecting portions 41b. In other words, the connecting portions 41a partially abut the connecting portions 41b.

With the above modification, for accurately positioning the magnet holder pieces 40A and 40B with respect to each other, it is only necessary to ensure the dimensional accuracy of the protrusions of the connecting portions 41a and 41b. Consequently, it becomes easier to manufacture the magnet holder pieces 40A and 40B.

[Modification 2]

In the previous embodiment, as shown in FIGS. 5 and 6, in each of the receiving portions 41a of the magnet holder piece 40A, there is formed the recess 43a. Similarly, in each of the receiving portions 41b of the magnet holder piece 40B, there is formed the recess 43b. The magnet holder pieces 40A and 40B are first assembled together so that each of the connecting portions 42a of the magnet holder piece 40A passes through a corresponding one of the recesses 43b of the magnet holder piece 40B, and each of the connecting portions 42b of the magnet holder piece 40B passes through a corresponding one of the recesses 43a of the magnet holder piece 40A. Then, the magnet holder pieces 40A and 40B are together assembled to the pole cores 12 and 14.

Figure 13:
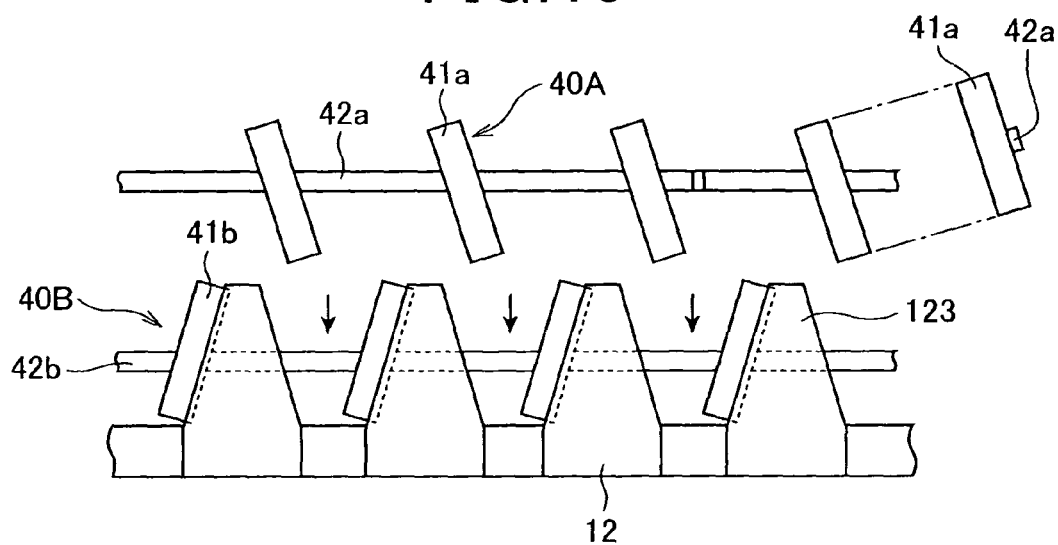
FIG. 13 is a schematic view illustrating another modification of the magnet holder pieces.

FIG. 13 shows the second modification of the magnet holder pieces 40A and 40B. In this modification, there is no recess 43a formed in each of the receiving portions 41a of the magnet holder piece 40A. Moreover, each of the connecting portions 42a is formed to protrude radially inward from the radially inner surface of a corresponding one of the receiving portions 41a. Similarly, there is formed no recess 43b in each of the receiving portions 41b of the magnet holder piece 40B. Moreover, each of the connecting portions 42b is formed to protrude radially inward from the radially inner surface of a corresponding one of the receiving portions 42a.

With the above configuration, the magnet holder pieces 40A and 40B are not necessarily assembled together prior to being assembled to the pole cores 12 and 14. Consequently, the flexibility in assembling the rotor 1 can be improved.

For example, referring to FIG. 13, the magnet holder piece 40B can be first fitted to the pole core 12, so that the receiving portions 41b of the magnet holder piece 40B respectively abut the circumferential side faces of the claw poles 123 which have the same slanting angle as the receiving portions 41b. Then, the magnet holder piece 40A can be further fitted to the pole core 12, so that the receiving portions 41a of the magnet holder piece 40A respectively abut the circumferential side faces of the claw poles 123 which have the same slanting angle as the receiving portions 41a. In addition, the connecting portions 42a of the magnet holder piece 40A are brought into abutment with the connecting portions 42b of the magnet holder piece 40B in the axial direction of the rotating shaft 11. After that, the pole core 14 can be further fitted to the magnet holder pieces 40A and 40B.

[Modification 3]

Figure 14:
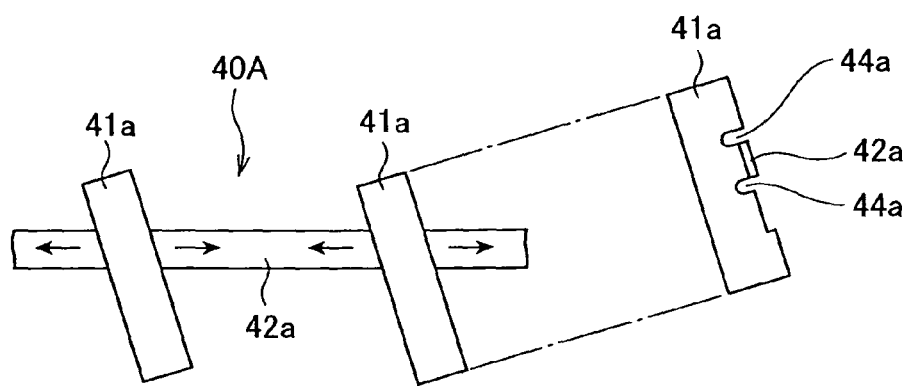
FIG. 14 is a schematic view illustrating yet another modification of the magnet holder pieces.

FIG. 14 shows the third modification of the magnet holder pieces 40A and 40B. In this modification, each of the receiving portions 41a of the magnet holder piece 40A has formed, in each of its circumferential side walls (corresponding to side faces B and C shown in FIG. 7), two slits 44a respectively on opposite sides of a root part of the connecting portion 42a extending from the circumferential side wall. Similarly, though graphically shown, each of the receiving portions 41b of the magnet holder piece 40B has formed, in each of its circumferential side walls, two slits 44b respectively on opposite sides of a root part of the connecting portion 42b extending from the circumferential side wall.

Generally, it is ideal that: the claw poles 123 of the pole core 12 have the same shape and size and be equally spaced in the circumferential direction of the rotating shaft 11; and the claw poles 143 of the pole core 14 have the same shape and size and be equally spaced in the circumferential direction of the rotating shaft 11. However, in practice, it is difficult to realize the above due to manufacturing to tolerances. Consequently, the receiving portions 41a of the magnet holder piece 40A cannot be located in the circumferential direction of the rotating shaft 11 at exactly equal intervals; the receiving portions 41b of the magnet holder piece 40B cannot be located in the circumferential direction of the rotating shaft 11 at exactly equal intervals. In addition, it is also difficult to form the receiving portions 41a and 41b of the magnet holder pieces 40A and 40B to have exactly the same shape and size due to the manufacturing tolerances. As a result, in some cases, it may be difficult to fit the magnet holder pieces 40A and 40B to the pole cores 12 and 14.

However, with the slits 44a and 44b formed in the receiving portions 41a and 41b, the root part of each of the connecting portions 42a and 42b can be easily deformed during the fitting of the magnet holder pieces 40A and 40B to the pole cores 12 and 14, thereby absorbing the manufacturing tolerances.

[Modification 4]

In the previous embodiment, the magnet holder pieces 40A and 40B are different from each other. More specifically, the receiving portions 41a of the magnet holder piece 40A have a different orientation from the receiving portions 41b of the magnet holder piece 40B. Therefore, in manufacturing the magnet holder pieces 40A and 40B, the nonmagnetic metal plate is first punched to form two different intermediate products as shown in FIG. 11. Then, the two intermediate products are further bent to respectively make up the magnet holder pieces 40A and 40B.

Figure 15:
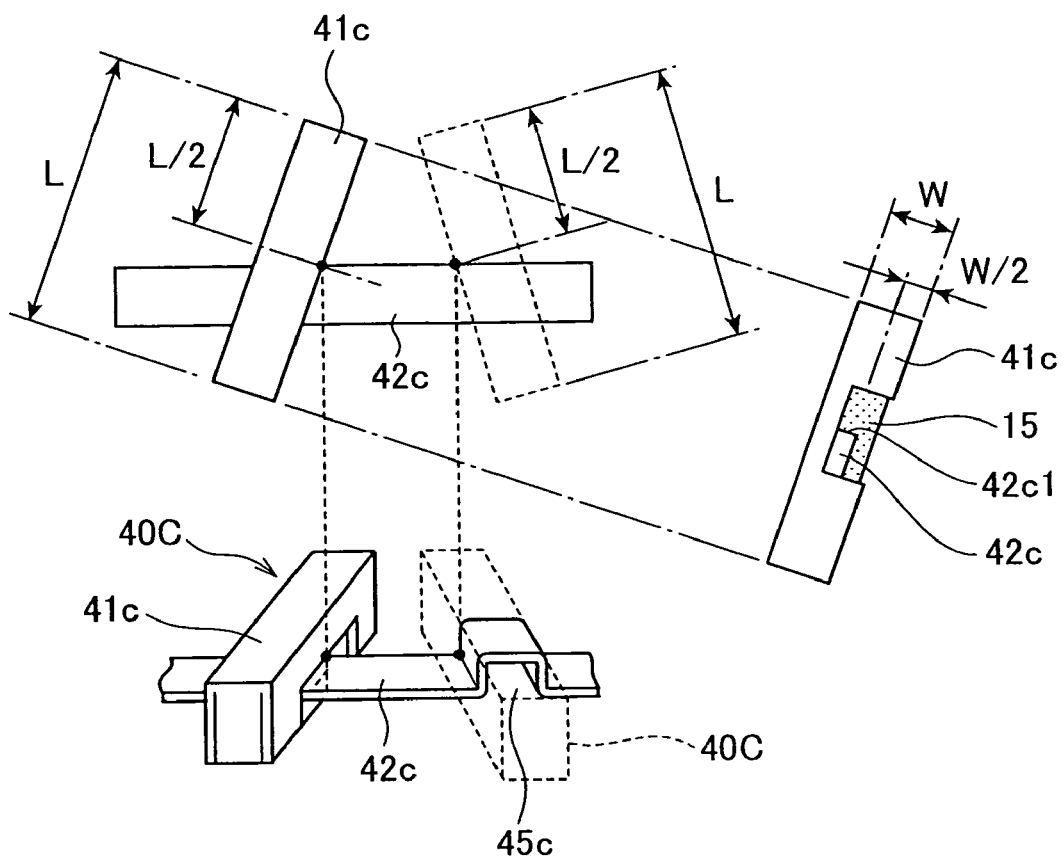
FIG. 15 is a schematic view illustrating still another modification of the magnet holder pieces.

FIG. 15 shows the fourth modification of the magnet holder pieces 40A and 40B. In this modification, a pair of identical magnet holder pieces 40C are used, instead of the magnet holder pieces 40A and 40B, to make up the magnet holder piece 40.

More specifically, each of the magnet holder pieces 40C has a plurality of receiving portions 41c and a plurality of connecting portions 42c. Each of the connecting portions 42c extends from a side face of a corresponding one of the receiving portions 41c with a radial side 42c1 thereof centered on the side face. Further, each of the connecting portions 42c has a recess 45c formed away from the corresponding receiving portion 41c by a predetermined distance.

In assembling the magnet holder pieces 40C, one of them is first made upside down with respect the other. Then, one of the magnet holder pieces 40C is placed as shown with solid lines in FIG. 15, and the other is placed as shown with dashed lines in the same. Consequently, each of the receiving portions 41c of the magnet holder pieces 40C is fitted into the recess 45c formed in a corresponding one of the connecting portions 42c of the magnet holder pieces 40C.

Thereafter, the assembly of the magnet holder pieces 40C is further bent into a ring shape, thereby forming the magnet holder 40. Consequently, in the magnet holder 40, the shape of one of the magnet holder pieces 40C is in inverse relation to that of the other magnet holder piece 40C in the radial direction of the rotating shaft 11.

Since the magnet holder pieces 40C are identical to each other, they can be formed with identical intermediate products punched out from a nonmagnetic metal plate. Consequently, the manufacturing cost of the magnet holder 40 can be reduced.

Second Embodiment

Figure 16:
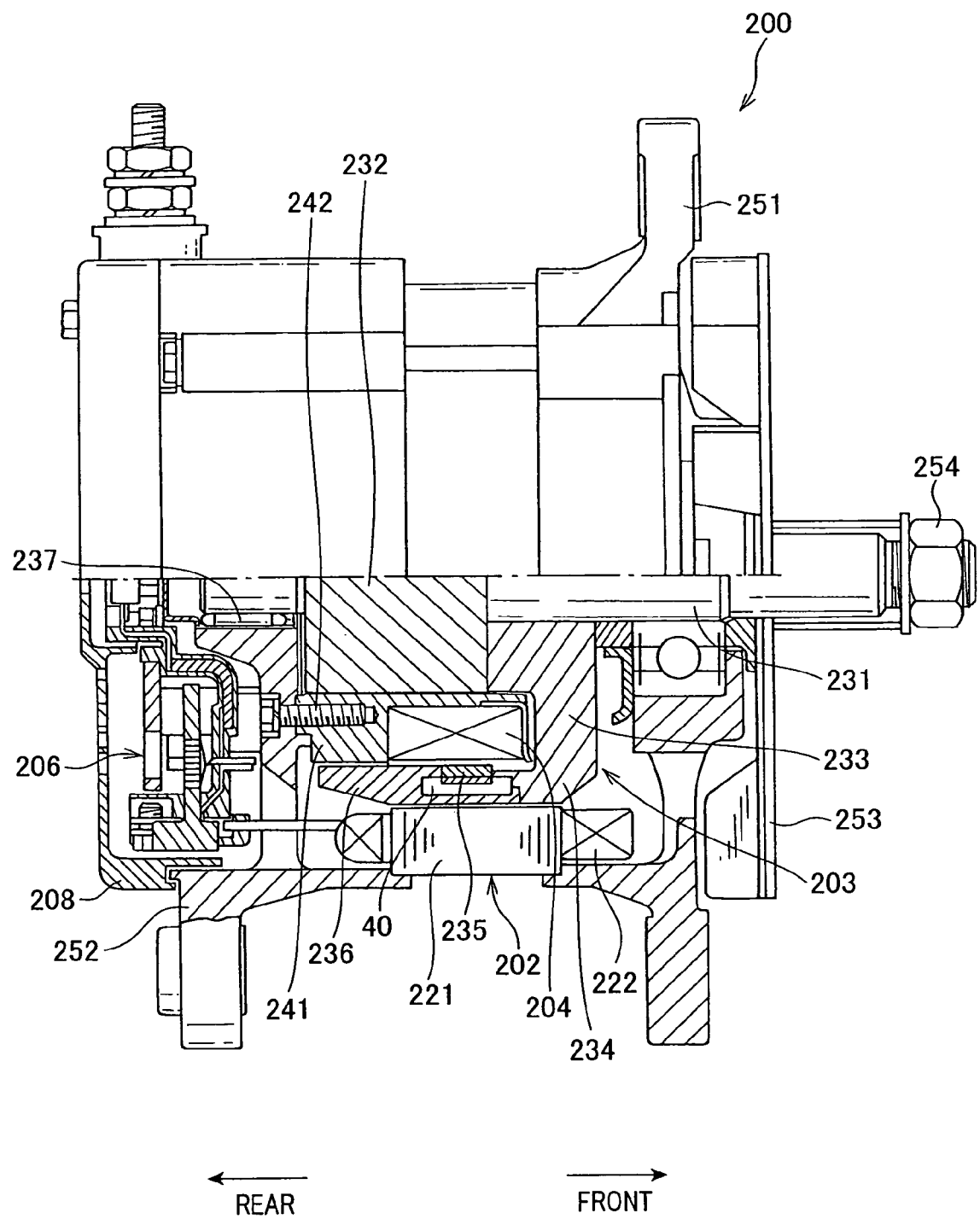
FIG. 16 is a schematic cross-sectional view of a brushless automotive alternator according to the second embodiment of the invention.

FIG. 16 shows the overall configuration of a brushless automotive alternator 200 according to the second embodiment of the invention.

The alternator 200 includes a stator 202, a rotor 203, a field winding 204, a front housing 251, a rear housing 252, a rectifier 206, a voltage regulator 207 (not shown), and a rear cover 208.

The stator 202, which functions as an armature of the alternator 200, includes a stator core 221 and a three-phase stator winding 222 wound around the stator core 221.

The rotor 203 is arranged so as to be surrounded by the stator 202.

Figure 17:
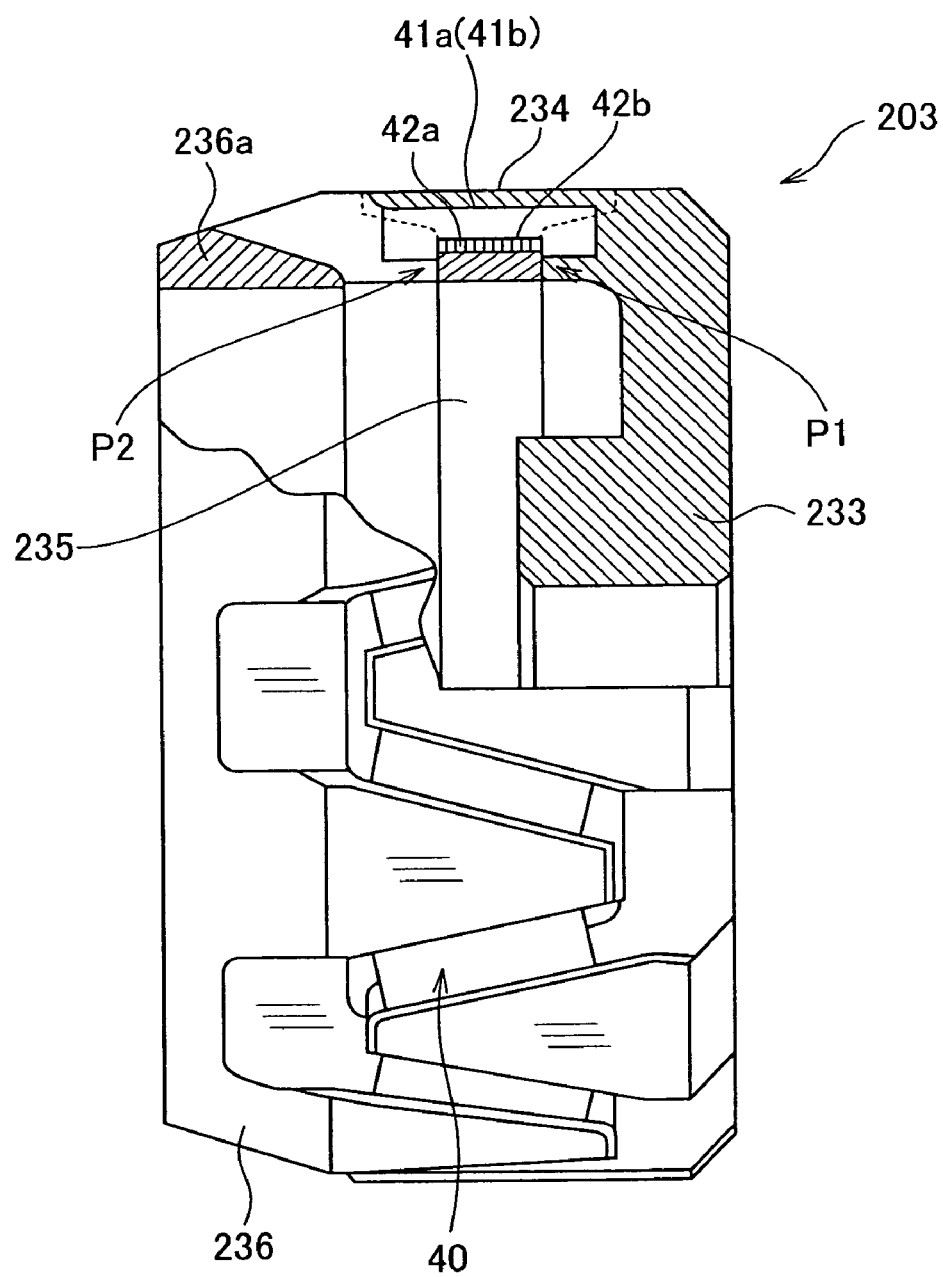
FIG. 17 is a partially cross-sectional view showing part of a rotor of the alternator of FIG. 16.
Figure 18:
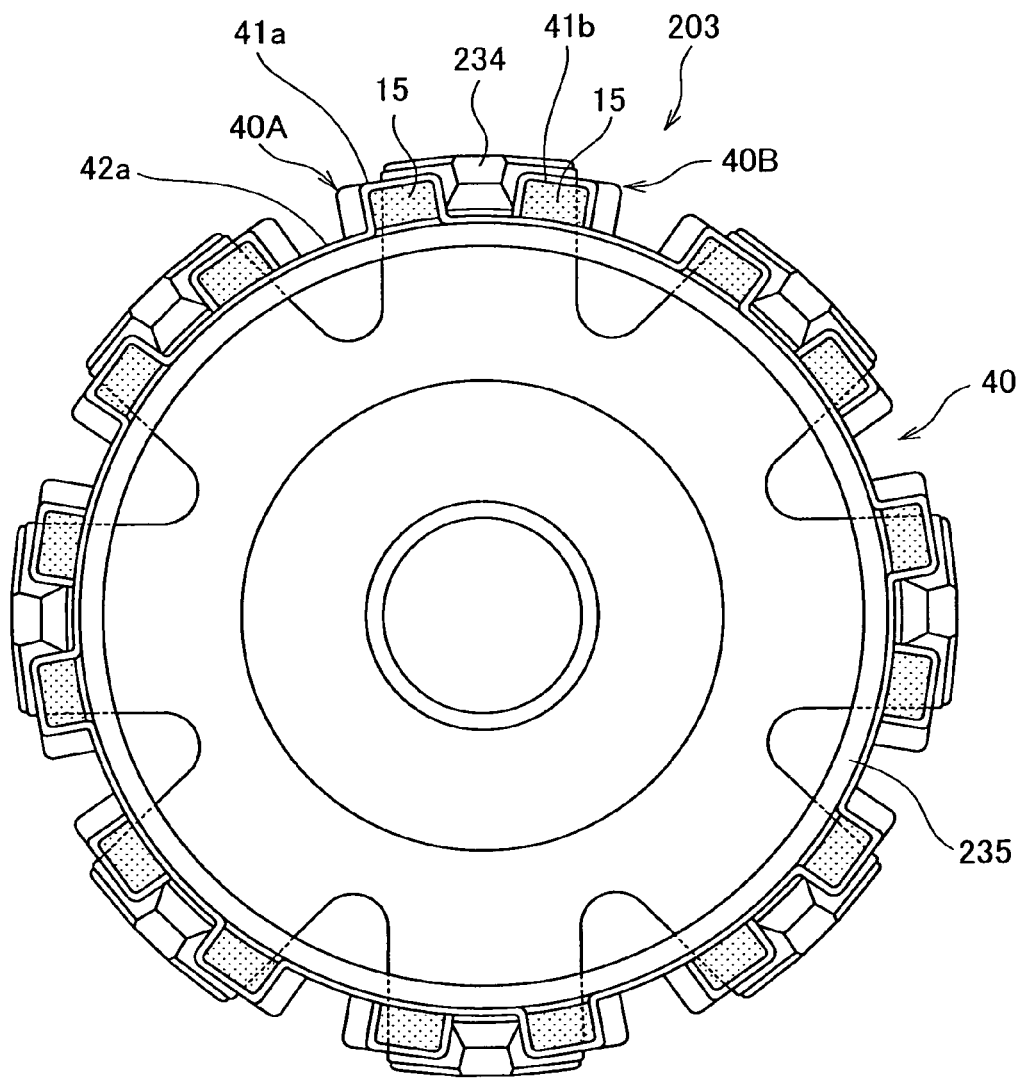
FIG. 18 is a schematic cross-sectional view of the rotor of FIG. 17.

Referring to FIGS. 17 and 18 together with FIG. 16, the rotor 203 includes a rotating shaft 231, rotating yoke portions 232 and 233 that are mounted on the rotating shaft 231, a plurality of claw poles 234 that are integrally formed with the rotating yoke portion 233, an annular connecting member 235, and a plurality of claw poles 236 that are connected to the claw poles 234 through the connecting member 235, a plurality of permanent magnets 15, and a magnet holder 40. In addition, on a rear end portion of the rotating shaft 231, there is mounted a bearing 237 to rotatably support the rotating shaft 231.

The claw poles 236 include a common, annular shoulder portion 236a by which the claw poles 236 are connected to each other in the circumferential direction of the rotating shaft 231. The claw poles 234 together make up part of one of a pair of Lundell-type pole cores, and the claw poles 236 together make up part of the other pole core.

The field winding 204 is wound around a fixed yoke portion 241. The fixed yoke portion 241 is cylindrical in shape and fixed to the rear housing 252 by means of bolts 242.

In the present embodiment, the rotor 203, the fixed winding 204, and the fixed yoke portion 241 together make up a field of the alternator 200. More specifically, the fixed winding 204 creates a magnetic flux when energized. With the magnetic flux, the rotor 203 creates a rotating magnetic field, which induces three-phase AC current in the three-phase stator winding 222 of the stator 202.

The front and rear housings 251 and 252 together support and accommodate therein both the stator 202 and the rotor 203. The above-mentioned bearing 237 is press-fitted in a bore formed in the rear housing 252, and thus fixed to the rear housing 252. From the front housing 251, a front end portion of the rotating shaft 231 protrudes so as to allow a cooling fan 253 and a pulley (not shown) to be mounted thereon by means of a nut 254.

The rectifier 206 is configured to full-wave rectify three-phase AC power output from the three-phase stator winding 222 into DC power. In addition, part of the DC power is used as the field current to energize the field winding 204.

The voltage regulator 207 is configured to regulate the output voltage of the alternator 200 by controlling the field current supplied to the field winding 204.

The rear cover 208 is fixed to the rear housing 252 to cover both the rectifier 206 and the regulator 207 from a rear side of the alternator 200, thereby protecting them from foreign matter.

The permanent magnets 15 have the same arrangement as in the first embodiment. More specifically, each of the permanent magnets 15 is interposed between an adjacent pair of one of the claw poles 234 and one of the claw poles 236 in the circumferential direction of the rotating shaft 231. Moreover, each of the permanent magnets 15 is so magnetized as to reduce leakage of magnetic flux between the adjacent pair of claw poles 234 and 236.

The magnet holder 40 has the same configuration as in the first embodiment. More specifically, the magnet holder 40 is composed of a pair of magnet holder pieces 40A and 40B. The magnet holder piece 40A includes a plurality of receiving portions 41a and a plurality of connecting portions 42a. The magnet holder piece 40B includes a plurality of receiving portions 41b and a plurality of connecting portions 42b.

In the present embodiment, as shown in FIG. 17, the sum of the width of the connecting portions 42a of the magnet holder piece 40A and the width of the connecting portions 42b of the magnet holder piece 40B in the axial direction of the rotating shaft 231 is set to be equal to the width of the annular connecting member 235 in the axial direction. Moreover, all of the connecting portions 42a of the magnet holder piece 40A and the connecting portions 42b of the magnet holder piece 40B are disposed radially outward of the connecting member 235 without a gap formed therebetween. In other words, the connecting portions 42a and 42b are concentrically disposed with the connecting member 235.

The magnet holder 40 can be assembled to the claw poles 234 and 236 in, for example, the following way. First, the magnet holder 40 is fitted to the claw poles 234. Then, the annular connecting member 235 is disposed to abut the connecting portions 42a and 42b of the magnet holder 40 in the radial direction and the claw poles 234 in the axial direction. Thereafter, the claw poles 236 are fitted to the magnet holder 40, while being brought into abutment with the connecting member 235 in the axial direction. Finally, the connecting member 235 and the connecting portions 42b of the magnet holder piece 40B are welded to the claw poles 234 as indicated with the arrow P1 in FIG. 17, and the connecting member 235 and the connecting portions 42a of the magnet holder piece 40A are welded to the claw poles 236 as indicated with the arrow P2 in FIG. 2. As a result, the claw poles 236 are securely fixed to the claw poles 234 via the connecting member 235 and the connecting portions 42a and 42b of the magnet holder 40.

While the above particular embodiments and modifications have been shown and described, it will be understood by those skilled in the art that various further modifications, changes, and improvements may be made without departing from the spirit of the invention.

For example, in the previous embodiments, the magnet holder 40 is composed of the pair of magnet holder pieces 40A and 40B.

However, the magnet holder 40 may also be composed of three or more magnet holder pieces. In this case, it is still required for each of the magnet holder pieces to have a plurality of receiving portions with the same orientation and a plurality of connecting portions connecting the receiving portions. The number of the receiving portions in each of the magnet holder pieces may be less than or equal to that in the magnet holder pieces 40A and 40B.

What is claimed is:

1. An automotive alternator comprising:
a rotor that creates a rotating magnetic field, the rotor including a rotating shaft, a pair of first and second pole cores, a plurality of permanent magnets, and a magnet holder, each of the first and second pole cores being fixed on the rotating shaft and including a plurality of claw poles extending in an axial direction of the rotating shaft, the claw poles of the first pole core being alternately arranged with the claw poles of the second pole core in a circumferential direction of the rotating shaft, each of the permanent magnets being interposed between a circumferentially-adjacent pair of the claw poles of the first and second pole cores to reduce leakage of magnetic flux therebetween, the magnet holder holding all the permanent magnets; and
a stator that generates AC power in the rotating magnetic field created by the rotor,
wherein
the magnet holder is composed of first and second magnet holder pieces,
each of the first and second magnet holder pieces is made of a nonmagnetic metal plate to have a one-piece structure,
each of the first and second magnet holder pieces includes a plurality of receiving portions and a plurality of connecting portions,
all the receiving portions of the first magnet holder piece have the same orientation and each receive therein a corresponding one of the permanent magnets,
each of the connecting portions of the first magnet holder piece extends in the circumferential direction of the rotating shaft to connect a circumferentially-adjacent pair of the receiving portions of the first magnet holder piece,
all the receiving portions of the second magnet holder piece have the same orientation and each receive therein a corresponding one of the permanent magnets, and
each of the connecting portions of the second magnet holder piece extends in the circumferential direction of the rotating shaft to connect a circumferentially-adjacent pair of the receiving portions of the second magnet holder piece.

2. The automotive alternator as set forth in claim 1, wherein the connecting portions of the first magnet holder piece are formed to be aligned with each other in the circumferential direction of the rotating shaft, and away from ends of the receiving portions of the first magnet holder piece in the axial direction of the rotating shaft, and
the connecting portions of the second magnet holder piece are formed to be aligned with each other in the circumferential direction of the rotating shaft, and away from ends of the receiving portions of the second magnet holder piece in the axial direction of the rotating shaft.

3. The automotive alternator as set forth in claim 2, wherein the connecting portions of the first magnet holder piece are arranged to abut the connecting portions of the second magnet holder piece in the axial direction of the rotating shaft.

4. The automotive alternator as set forth in claim 3, wherein each of the connecting portions of the first and second magnet holder pieces has a side face that is made uneven to include at least one protrusion, and
at boundaries between the connecting portions of the first magnet holder piece and the connecting portions of the second magnet holder piece, only the protrusions of the connecting portions of the first magnet holder piece abut the protrusions of the connecting portions of the second magnet holder piece.

5. The automotive alternator as set forth in claim 1, wherein the shape of the first magnet holder piece is in inverse relation to the shape of the second magnet holder piece in a radial direction of the rotating shaft.

6. The automotive alternator as set forth in claim 5, wherein in each of the first and second magnet holder pieces, each of the connecting portions extends from a side face of a corresponding one of the receiving portions with a radial side thereof centered on the side face, and has a recess formed away from the corresponding receiving portion by a predetermined distance, and
each of the receiving portions of the first magnet holder piece is fitted in the recess formed in a corresponding one of the connecting portions of the second magnet holder piece, and each of the receiving portions of the second magnet holder piece is fitted in the recess formed in a corresponding one of the connecting portions of the first magnet holder piece.

7. The automotive alternator as set forth in claim 1, wherein in each of the receiving portions of the first magnet holder piece, there is formed a recess through which a corresponding one of the connecting portions of the second magnet holder piece passes,
each of the receiving portions of the first magnet holder piece completely encloses, together with the corresponding connecting portion of the second magnet holder piece, the permanent magnet received therein,
in each of the receiving portions of the second magnet holder piece, there is formed a recess through which a corresponding one of the connecting portions of the first magnet holder piece passes, and
each of the receiving portions of the second magnet holder piece completely encloses, together with the corresponding connecting portion of the first magnet holder piece, the permanent magnet received therein.

8. The automotive alternator as set forth in claim 1, wherein each of the receiving portions of the first and second magnet holder pieces has formed, in each of its circumferential side walls, two slits respectively on opposite sides of a root part of the connecting portion extending from the circumferential side wall.

9. The automotive alternator as set forth in claim 1, wherein each of the first and second magnet holder pieces has an opposite pair of ends that are apart from each other in the circumferential direction of the rotating shaft with a gap formed therebetween, and the opposite pair of ends are both arranged to abut a radially inner surface of one of the claw poles of the first and second pole cores.

10. The automotive alternator as set forth in claim 9, wherein the gap is positioned, in the circumferential direction of the rotating shaft, at the center of the one of the claw poles.

11. The automotive alternator as set forth in claim 1, wherein the orientation of the receiving portions of the first magnet holder piece is different from the orientation of the receiving portions of the second magnet holder piece, and the receiving portions of the first magnet holder piece are alternately arranged with the receiving portions of the second magnet holder piece in the circumferential direction of the rotating shaft.

12. The automotive alternator as set forth in claim 1, wherein the claw poles of the first pole core are connected to the claw poles of the second pole core through an annular connecting member that is disposed radially inward of the connecting portions of the first and second magnet holder pieces, and the annular connecting member is welded to all of the claw poles of the first and second pole cores, and the connecting portions of each of the first and second magnet holder pieces are welded to the claw poles of one of the first and second pole cores.

* * * * *